(12) United States Patent
Shor et al.

(10) Patent No.: US 10,334,008 B2
(45) Date of Patent: *Jun. 25, 2019

(54) METHOD AND DEVICE FOR DATA STREAMING IN A MOBILE COMMUNICATION SYSTEM

(71) Applicants: Roy Shor, Tel-Aviv (IL); Ori Goren, Kibutz Ruchama (IL); Avraham Horn, Givat Shmuel (IL); Avraham Rabinovich, Austin, TX (US)

(72) Inventors: Roy Shor, Tel-Aviv (IL); Ori Goren, Kibutz Ruchama (IL); Avraham Horn, Givat Shmuel (IL); Avraham Rabinovich, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/899,132

(22) PCT Filed: Jul. 4, 2013

(86) PCT No.: PCT/IB2013/055473
§ 371 (c)(1),
(2) Date: Dec. 17, 2015

(87) PCT Pub. No.: WO2015/001390
PCT Pub. Date: Jan. 8, 2015

(65) Prior Publication Data
US 2016/0142458 A1 May 19, 2016

(51) Int. Cl.
*H04L 29/06* (2006.01)
*H04L 29/08* (2006.01)
(Continued)

(52) U.S. Cl.
CPC .............. *H04L 65/60* (2013.01); *H04L 29/08* (2013.01); *H04L 29/10* (2013.01); *H04W 76/00* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 4,200,930 A | | 4/1980 | Rawings et al. |
| 4,263,647 A | * | 4/1981 | Merrell .............. G05B 19/4063 700/169 |

(Continued)

OTHER PUBLICATIONS

International Search Report and Written Opinion correlating to PCT/IB2013/055473 dated Mar. 19, 2014.

(Continued)

*Primary Examiner* — Andrew C Oh (57) ABSTRACT

Interfacing between radio units in a base station in a mobile communication system uses a common public radio interface CPRI for streaming IQ data samples arranged in lanes. A separate serial interface sRIO is now additionally used for transferring selected data samples arranged in packets, the selected samples corresponding to selected lanes streamed between other radio units via the common public radio interface. In the radio unit, the selected data samples are arranged in packets to be transmitted via the serial interface, and, vice versa, the selected data samples arranged in packets received via the serial interface are arranged in lanes. A system timer coupled to the CPRI generates a timebase for controlling the sRIO interface in order to have it synchronized. Advantageously the data sample transfer capacity of the streaming CPRI interface is extended using the packet based serial interface.

15 Claims, 7 Drawing Sheets

(51) Int. Cl.
 *H04L 29/10* (2006.01)
 *H04W 76/00* (2018.01)
 *H04W 88/08* (2009.01)

(56) References Cited

U.S. PATENT DOCUMENTS

| | | | | |
|---|---|---|---|---|
| 5,487,181 | A * | 1/1996 | Dailey | H04B 1/40 455/557 |
| 5,642,350 | A | 6/1997 | Dailey | |
| 5,991,817 | A * | 11/1999 | Rowett | H04L 45/60 370/392 |
| 6,278,921 | B1 * | 8/2001 | Harrison | G01C 21/26 340/426.15 |
| 6,304,911 | B1 * | 10/2001 | Brcich | G06F 13/128 370/468 |
| 6,934,301 | B2 | 8/2005 | Jordan | |
| 7,831,745 | B1 | 11/2010 | Eiriksson et al. | |
| 8,908,650 | B2 | 12/2014 | Aarflot et al. | |
| 2003/0182484 | A1 * | 9/2003 | Gaur | G06F 13/24 710/260 |
| 2003/0200372 | A1 * | 10/2003 | Doragh | G06F 1/3209 710/305 |
| 2004/0120339 | A1 * | 6/2004 | Ronciak | H04L 49/901 370/429 |
| 2004/0236930 | A1 * | 11/2004 | Diepstraten | G06F 9/4812 712/220 |
| 2005/0135412 | A1 | 6/2005 | Fan | |
| 2005/0188129 | A1 | 8/2005 | Abdelilah et al. | |
| 2007/0101035 | A1 * | 5/2007 | Son | G06F 1/1632 710/301 |
| 2007/0101036 | A1 * | 5/2007 | Son | G06F 1/1632 710/301 |
| 2007/0143579 | A1 * | 6/2007 | Shih | G06F 9/3001 712/200 |
| 2007/0171866 | A1 | 7/2007 | Merz et al. | |
| 2008/0089689 | A1 * | 4/2008 | Sakama | H04W 88/085 398/115 |
| 2008/0181245 | A1 * | 7/2008 | Basso | H04L 47/50 370/412 |
| 2009/0016217 | A1 * | 1/2009 | Kashyap | H04L 47/2408 370/231 |
| 2009/0216917 | A1 * | 8/2009 | Shasha | G06F 13/30 710/25 |
| 2009/0291681 | A1 * | 11/2009 | Hara | H04W 88/085 455/422.1 |
| 2009/0323710 | A1 * | 12/2009 | Shahan | H04L 47/10 370/412 |
| 2010/0064069 | A1 * | 3/2010 | Shasha | G06F 13/28 710/22 |
| 2010/0106874 | A1 * | 4/2010 | Dominguez | G06F 13/24 710/260 |
| 2011/0032910 | A1 * | 2/2011 | Aarflot | H04J 3/0682 370/335 |
| 2011/0050618 | A1 | 3/2011 | Murphy | |
| 2011/0075616 | A1 * | 3/2011 | Baldwin | H04W 88/085 370/329 |
| 2011/0080283 | A1 * | 4/2011 | Schweitzer, III | G01R 31/085 340/539.26 |
| 2011/0117901 | A1 | 5/2011 | Li et al. | |
| 2011/0138096 | A1 * | 6/2011 | Radulescu | G06F 13/385 710/305 |
| 2011/0164624 | A1 * | 7/2011 | Kelleher | H04B 1/40 370/475 |
| 2011/0170577 | A1 | 7/2011 | Anvari | |
| 2012/0009977 | A1 * | 1/2012 | Yu | H04W 88/10 455/552.1 |
| 2012/0057572 | A1 * | 3/2012 | Evans | H04W 88/085 370/338 |
| 2012/0113972 | A1 * | 5/2012 | Liu | H04W 88/085 370/338 |
| 2012/0151537 | A1 | 6/2012 | Singh et al. | |
| 2012/0311411 | A1 * | 12/2012 | Kirkpatrick | H03M 13/091 714/807 |
| 2013/0051329 | A1 | 2/2013 | Take | |
| 2013/0163524 | A1 | 6/2013 | Shatzkamer et al. | |
| 2013/0237161 | A1 | 9/2013 | Zhao et al. | |
| 2013/0294419 | A1 * | 11/2013 | Heiser | H04W 28/16 370/336 |
| 2013/0326252 | A1 * | 12/2013 | Ise | G06F 1/3234 713/323 |
| 2014/0094157 | A1 * | 4/2014 | Nguyen | H04W 88/085 455/418 |
| 2014/0198684 | A1 * | 7/2014 | Gravely | H04W 24/02 370/254 |
| 2014/0317220 | A1 | 10/2014 | Karlsson et al. | |
| 2015/0117861 | A1 * | 4/2015 | Ponzini | H04B 10/2575 398/79 |
| 2015/0347332 | A1 * | 12/2015 | Shor | G06F 13/287 710/308 |
| 2015/0372930 | A1 * | 12/2015 | Shor | H04L 47/2458 370/329 |
| 2016/0037580 | A1 * | 2/2016 | Shor | H04W 88/085 370/328 |
| 2016/0142458 | A1 | 5/2016 | Shor et al. | |

OTHER PUBLICATIONS

CPRI Specification V5.0, "Common Public Radio Interface (CPRI); Interface Specification", Sep. 21, 2011, pp. 1-119.
Fact sheet B4860 "QorIQ Qonverge B4860 Baseband Processor" by Freescale.
"Next-Generation Wireless Network Bandwidth and Capacity Enabled by Heterogeneous and Distributed Networks" White Paper by Freescale.
RapidIO™ Interconnect Specification, Rev. 2.1, Aug. 2009, RapidIO Trade Association.
Final Office Action dated Oct. 11, 2017 for U.S. Appl. No. 14/899,137 28 pages.
Non-Final Office Action for U.S. Appl. No. 14/899,137, dated May 11, 2017, 19 pages.
Notice of Allowance dated Mar. 20, 2019 for U.S. Appl. No. 14/899,137, 13 Pages.

* cited by examiner

METHOD AND DEVICE FOR DATA STREAMING IN A MOBILE COMMUNICATION SYSTEM

FIELD OF THE INVENTION

This invention relates to data streaming in a base station in a mobile communication system. An example of a mobile communication system is a fourth generation (4G) cell based mobile communication system such as LTE system (Long Term Evolution, which is the most recent step forward from cellular 3G services) or the Wideband Code Division Multiple Access (W-CDMA) system.

An overview of such communication systems can be found in the white paper "Next-Generation Wireless Network Bandwidth and Capacity Enabled by Heterogeneous and Distributed Networks" by Freescale, which company also provides processors for such systems such as B4860 "QorIQ Qonverge B4860 Baseband Processor". This processor targets macro cell base station designs for broadband wireless infrastructure and has four 64 bit, dual-threaded processor cores, six 16 bit 32 GMAC/cycle calculation cores and baseband acceleration processing engines. It is designed to adapt to the rapidly changing and expanding standards of LTE (FDD and TDD), LTE-Advanced and WCDMA and supports different standards simultaneously. Technical data for the B4860 processor is available via http://www.freescale.com/webapp/sps/site/prod_summary.jsp?code=B4860.

The invention concerns interfacing in the base station, which the base station comprises radio units including at least one radio equipment unit coupled to at least one antenna and at least one radio equipment controller unit for controlling the radio equipment unit. Such different types of radio units have, for interfacing between the radio units, a common public radio interface according to a common public radio interface standard (CPRI) for streaming data samples (IQ) arranged in lanes corresponding to antenna signals. Multiple radio equipment controller units and/or radio equipment units may be coupled in a chain, while such a chained unit may process part of the data samples and forward a further part to a subsequent unit. The last unit in the chain may exchange data samples with a preceding unit and locally process all data samples. In this context processing in the radio equipment unit involves converting the data samples into antenna signals and vice versa, whereas processing data samples in the radio controller unit may involve converting data payload to be communicated into IQ data samples representing modulated antenna signals, and vice versa. As such, said processing in the units in the base station is well known.

BACKGROUND OF THE INVENTION

In cell based mobile communication systems base stations are provided to communicate with the mobile devices. Such base stations usually have a high frequency radio part, called Radio Equipment (RE), coupled to an antenna for exchanging radio signals with the mobile devices, which RE is controlled by a further part called Radio Equipment Controller (REC). The REC may be located in the base-station cabinet, while the RE is usually located near the antennas. An interface between both parts has been standardized, and is called Common Public Radio Interface (CPRI).

The standard "Common Public Radio Interface (CPRI); Interface Specification V5.0 (2011 Sep. 21)", as provided on http://www.cpri.info, describes an example of the interface, abbreviated as CPRI. The CPRI configuration may have multiple Radio Equipment Controllers (REC) and/or multiple Radio Equipments (RE) connected point to point in a chain network using very high frequencies (up to 9.8 GHz) for streaming interfacing. Data samples are received at the RE and interfaced to the REC via an IQ data link called a lane, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

Figure 1:
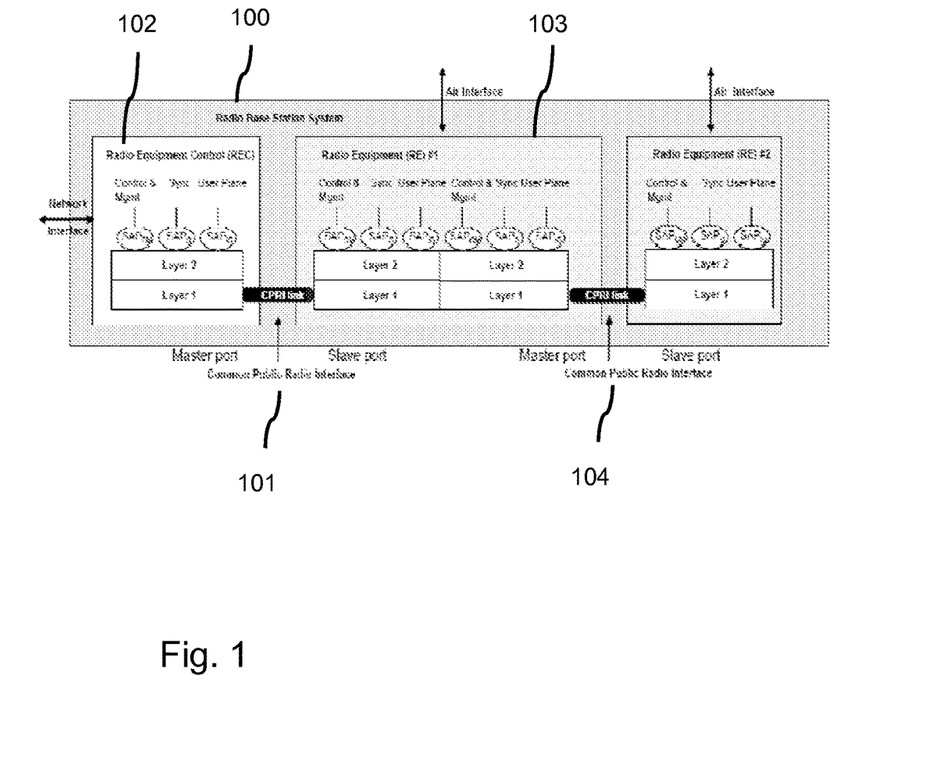
FIG. 1 shows an example of CPRI connectivity.

FIG. 1 shows an example of CPRI connectivity. The Figure shows an example of a base station architecture 100 comprising a CPRI interface 101 between a REC 102 and an RE 103. A further CPRI interface 104 may be provided to interconnect multiple RECs in a chain. As such, the CPRI interface is described in the CPRI V5 and chapter 2 describes the CPRI related parts of the basic radio base station system architecture. The Figure is taken from chapter 2 (see CPRI V5, FIGS. 2 and 2A on page 10) and is further described in chapter 2.2 System Architecture of the CPRI standard.

It is noted that, in large base stations, multiple lanes of I,Q data samples may be used between RE and REC, and between REC and subsequent RECs in the chain. Each REC may locally process data samples of some lanes, and pass samples of other lanes to further RECs. However, the number of lanes for an individual REC is limited, and a substantial part of said lanes may be required to connect to the RE. Hence a limit for the number of useable lanes depends on the actual number of lanes that the first REC in said chain has available, which limit may be unduly restrict extending the base station to handle larger numbers of lanes from the RE. Similar problems may apply to a chain of REs.

SUMMARY OF THE INVENTION

The present invention provides an interfacing method and devices, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

For the radio units as described in the introduction, current CPRI controllers in chips for baseband processing (also called Layer 1 processing) support chaining of multiple units. The connection between the RE and REC can be through a CPRI interface. Additionally, radio controllers in such a chain may be coupled via a further serial interface, e.g. for communication control data. For example, further REC in the chain of CPRI controllers may further be connected to the primary REC through a high speed serial interface for transferring control data in packets, such as the serial Rapid Input Output (sRIO) interface. Also the radio equipment units (RE) may be chained, and may have the additional serial interface separate from the common public radio interface according to a common public radio interface standard (CPRI). It is noted that although CPRI and sRIO are used as examples for elucidating the proposed system below having both a common public radio interface and a separate serial packet based interface, other data streaming interfaces and/or packet based interfaces may also be used. For example PCI Express is a well known example of such a packet based serial interface.

CPRI is a data streaming protocol via a dedicated interface, where one lane per controller may be running in link rates of up to 9.8304 Gbaud. About 94% of the frames are used to transfer the IQ data samples, while the remaining frames are available mainly for control and management data (C&M), for example formatted according to the well known Ethernet or HDLC protocol.

sRIO is a packet based protocol using a serial interface providing data communication between sRIO controllers using link rates of up to 5 Gbaud. Packets are processed according to a command in the heading (WRITE, READ, etc). In the RX direction the packets are received by a sRIO controller and depending on the command the packet data is processed or read/written from/to a memory by the serial interface controller. In the TX direction the packets may be prepared in a memory and a DMA unit may be programmed to deliver them to the sRIO controller for transmission. The sRIO architecture is a high-performance packet-switched, interconnect technology for interconnecting chips on a circuit board, and also circuit boards to each other using a backplane. It may also be used to connect racks with cabling. Further information and a specification "RapidIO Interconnect Specification, Rev 2.1 08/2009" is available via http://www.rapidio.org.

Figure 2:
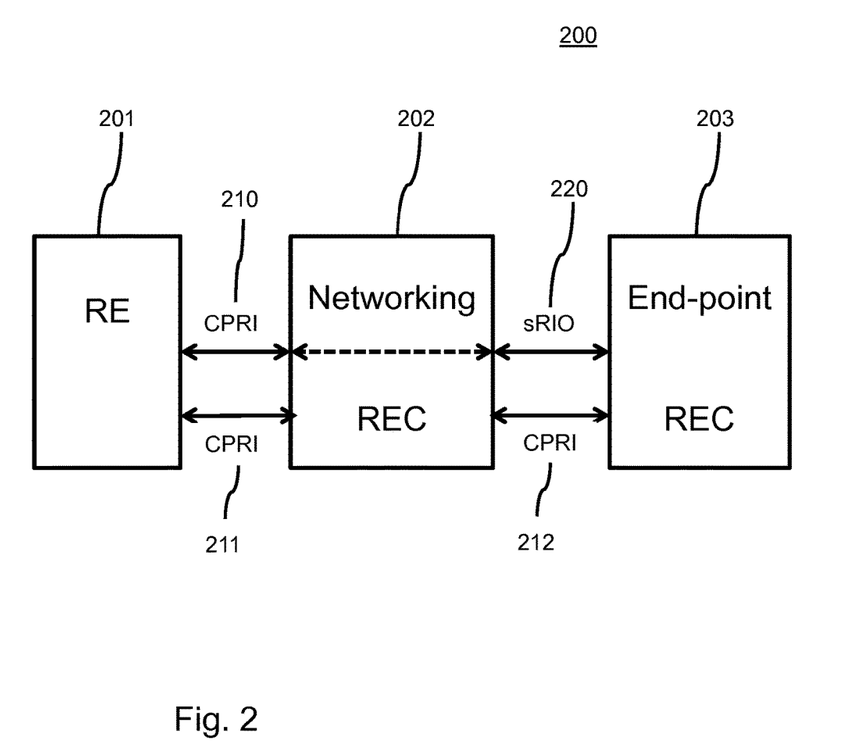
FIG. 2 shows an example of interfacing between radio units in a base station.

FIG. 2 shows an example of interfacing between radio units in a base station. The base station 200 has a radio equipment unit RE 201, a first radio equipment controller unit REC 202, which is named networking REC due to being coupled in a chain to a subsequent REC called End-point REC 203 due to it being the final radio controller unit in the chain. The RE 201 is coupled to the first REC 202 via a common public radio interface 210,211 according to a common public radio interface standard (CPRI) as indicate by two arrows representing multiple lanes 210,211 corresponding to antenna signals for streaming data samples (IQ). A lane corresponds to a physical connection, e.g. one cable via one connector, so a lane means a physical connection between two radio units The first, networking REC is further coupled to the subsequent end-point REC via a further lane 212 of the common public radio interface. Furthermore, both the first, networking REC and the subsequent end-point REC have a separate serial interface 220, for example the serial rapid Input Output (sRIO) interface, which provides a packet based interface. The interfacing is further described below.

Figure 3:
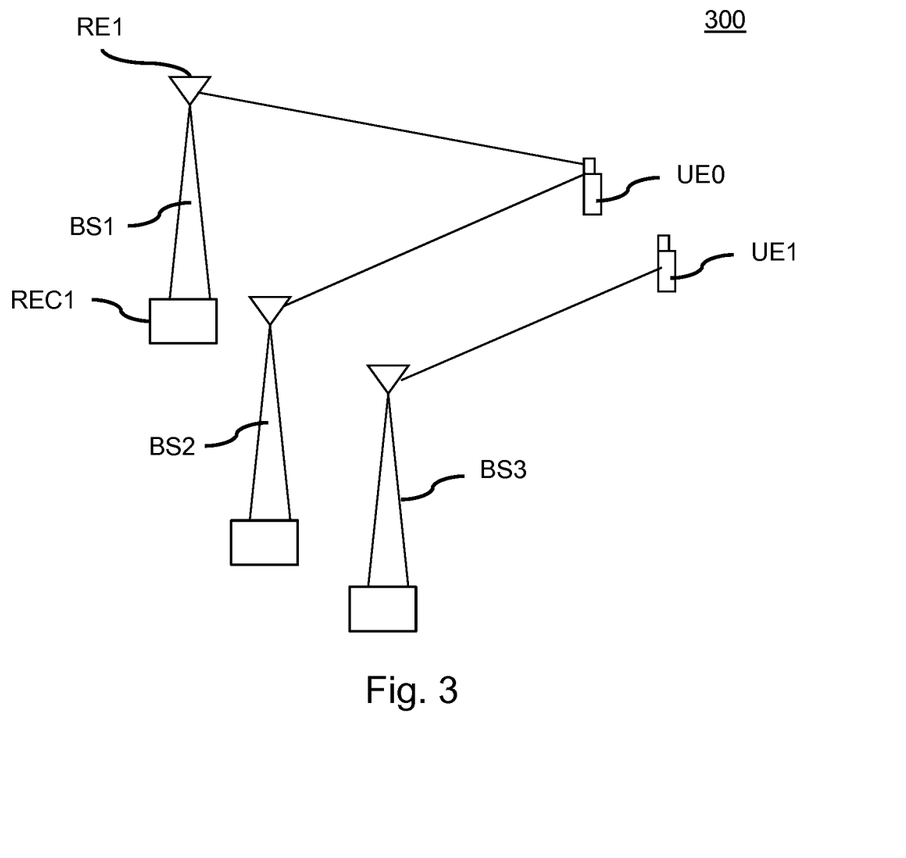
FIG. 3 shows an example of an overview of a mobile communication system.

FIG. 3 shows an example of an overview of a mobile communication system. In the example, the mobile communication system 300 has three base stations BS1, BS2, BS3 and two mobile devices, called user equipment UE0, UE1. The first user equipment UE0 is shown to communicate with two base stations BS1 and BS2, e.g. in a communication handover process, and the other user equipment UE1 is shown to communication with BS3. In the base station BS1 radio unit RE1, is coupled to an antenna for radio transmitting and receiving. The radio unit RE1 is coupled to a radio controller unit REC1 for providing transmission data and control information to the radio unit RE1.

The radio equipment unit RE1 and radio equipment controller unit REC 1 in the base station BS1 in the mobile communication system 300 are connected via an interface. Thereto, the radio controller equipment unit has a common public radio interface according to a common public radio interface standard, for example CPRI, and the radio equipment unit RE1 also has the common public radio interface.

In the base station, multiple REC and/or multiple RE radio units may be coupled in a chain. However, the amount of data samples that may be transferred via the CPRI lanes of such radio units is limited. Hence, for bases station having a large or growing data handling capacity, such capacity may be limited due to the capacity of the lanes of the common public radio interface as provided by the available radio units. Adding more lanes to the radio units may solve the limited capacity, but requires replacements by more expensive units, which may not be available or may be too bulky to install. Hence there may be a need to have radio units that provide more streaming data interfacing capacity. Instead of adding further streaming data interfacing capacity, the following is proposed. For accommodating a requirement to share the IQ data between different RECs or REs, e.g. in the situation the number of used lanes between the RE and the REC is more than the existing remaining CPRI lanes for chain coupling the REC or RE, the sRIO channel is adapted to be used as a additional chain interfacing capability by converting streaming data samples from some selected lanes to be transferred in packets via the separate serial interface. So the idea is to enable IQ data traffic to be seamlessly forwarded by the REC device from the CPRI interface to sRIO interface and vice versa. Using the sRIO channel to support a daisy chain topology for the additional lanes needed, enables additional system connectivity when the number of the existing CPRI lanes is not enough.

In view of the above, interfacing in a base station in the mobile communication system 300 is proposed. The base station has radio units including at least one radio equipment unit RE1 coupled to at least one antenna and at least one radio equipment controller unit REC1 for controlling the radio equipment unit. The radio units have a common public radio interface according to a common public radio interface standard (CPRI) for streaming data samples (IQ) arranged in lanes corresponding to antenna signals. Furthermore, the radio units have a serial interface for transferring packets separate from the common public radio interface.

The interfacing system in the base station involves transferring, between a first and a second radio unit, selected data samples arranged in packets via the serial interface. The interfacing involves receiving the selected data samples via the common public radio interface, transmitting the packets having the selected data samples via the serial interface, and, vice versa, receiving the packets having the selected data samples via the serial interface, and transmitting the selected data samples via the common public radio interface. The selected samples correspond to selected lanes streamed between the first or second radio unit and a preceding radio unit via the common public radio interface but not streamed between the first and second radio unit via the common public radio interface. Such selecting may be configured when installing the system, or may be predetermined by the manufacturer of the radio units or semiconductor devices used in such radio units.

In the above first radio unit, the selected data samples to be transmitted via the serial interface are arranging in packets, and, vice versa, the selected data samples arranged in packets received via the serial interface are arranged in lanes for further streaming via the common public radio interface.

Similarly, in the above second radio unit, the selected data samples arranged in packets received via the serial interface are arranged in lanes, and, vice versa, the selected data samples to be transmitted via the serial interface are arranged in packets.

A device for use in the radio unit as defined above has a common public radio interface according to a common public radio interface standard (CPRI) for streaming data samples (IQ) arranged in lanes corresponding to antenna signals and a serial interface for transferring packets separate from the common public radio interface. As further elucidated with FIGS. 4 and 5 below, the device has a data handler for the above described interfacing. Thereto, the device is arranged for transferring, between the device and a subsequent radio unit, selected data samples arranged in packets via the serial interface, the selected samples corresponding to selected lanes streamed between the device and a preceding radio unit via the common public radio interface and not streamed between the device and the subsequent radio unit via the common public radio interface. Furthermore, the data handler converts the selected data samples from streaming to packets to be transmitted via the serial interface, and, vice versa, converts the selected data samples arranged in packets received via the serial interface to streaming data samples.

Optionally, the above device has a data processor for processing the data samples. Also the data handler may be configured for transferring, to the processor, further data samples arranged in further lanes, the further lanes being streamed between the device and a preceding radio unit via the common public radio interface and being different from the selected lanes. So data samples of the further lanes are processed locally in the respective radio unit, whereas selected data samples are bypassed to a next radio unit. Note that, in addition, some lanes may be transferred via chain coupled CPRI lanes where such lanes are available.

Optionally, the data handler has a direct memory access unit (DMA) for directly accessing a memory. Also, the data handler may be configured for said arranging in packets by storing selected data samples in the memory according to a buffer descriptor, and providing the buffer descriptor to the direct memory access unit. The direct memory access unit may be is configured for transferring the selected data samples from the memory to the serial interface according to the buffer descriptor (BD). The BD contains information on a packet like size and location.

Optionally, the data handler may be configured for providing the buffer descriptor for respective data buffers corresponding to units of antenna data. Units of antenna data may be predefined or derived from a standard such as CPRI, where such units are named AxC, usually followed by an indication of the corresponding lane. The buffer descriptor may be aligned to such units of antenna data. Furthermore, the data handler may be configured for maintaining a ring memory for storing buffer descriptors for respective data buffers. The sequence of stored buffer descriptors in the ring memory corresponds to sets of data samples to be transferred as packets. A BD ring is a memory location in the system memory where the BDs are stored one after the other in a "ring" manner. Operationally, BD mode means that the BDs are used in order to transmit corresponding packets.

Optionally, the data handler is arranged for transferring a predetermined amount of the selected data samples for the selected lanes arranged in M packets via the serial interface. The number M may correspond to the number of selected lanes so that one packet is transferred for each lane, but may also be a multiple of the number of selected lanes, e.g. two. Subsequently, the data handler may generate and transfer, to the further radio unit via the serial interface, an interrupt packet after transferring said M packets for the selected lanes. By inserting such an interrupt packet after the series of M packets, enables the receiving radio unit to just wait for the interrupt, and obviates monitoring all packets and/or deciding for each arriving packet whether to start processing.

Optionally, the device is configured for transferring data samples of N lanes to the subsequent radio unit via the common public radio interface, and the device is configured for generating and transferring, to a subsequent radio control device, an interrupt packet after transferring a predetermined amount of the data samples of the N lanes. The interrupt packet may be applied for synchronizing the processing of streaming data samples transferred via the common public radio interface and the redirected, converted samples transferred in packets.

It is noted that the end-point radio unit 203 may be different from the networked radio unit. While the function described above may be present, a device for use in the end-point radio unit may be as follows. The device has a common public radio interface according to a common public radio interface standard (CPRI) for streaming data samples (IQ) arranged in lanes corresponding to antenna signals and a serial interface for transferring packets separate from the common public radio interface. Also, the device has a data handler arranged for transferring, between the end-point radio unit and a preceding radio unit, selected data samples arranged in packets via the serial interface. The selected samples correspond to selected lanes not streamed between the device and the preceding radio unit via the common public radio interface. Furthermore, the data handler is for arranging in packets the selected data samples to be transmitted via the serial interface, and, vice versa, arranging in lanes the selected data samples arranged in packets received via the serial interface.

Optionally, the device is arranged for receiving an interrupt packet indicative of transferring, by a preceding radio unit, a predetermined amount of the selected data samples for the selected lanes arranged in M packets via the serial interface. The interrupt packed may be recognized by the device based on an indicator included in the packet, e.g. in the header, or in a control data field in the packet. Furthermore the device is arranged for, upon receiving the interrupt packet, triggering processing the selected data samples according to data samples arranged in lanes. For example, the packet may be recognized by a packet handler, and when said indicator indicates the interrupt packet, a special interrupt register is written by the packet handler for generating a hardware interrupt, e.g. for a core processor, so as to start processing the available samples of the selected lanes.

Optionally, the device is arranged for transferring data samples of N lanes to the preceding radio unit via the common public radio interface, and for receiving an interrupt packet indicative of transferring, by a preceding radio unit, transferring a predetermined amount of the data samples of the N lanes. The interrupt packed may be recognized by the device based on an indicator included in the packet, e.g. in the header, or in a control data field in the packet. Furthermore the device is arranged for, upon receiving the interrupt packet triggering processing the predetermined amount of the data samples. For example, the packet may be recognized by a packet handler, and when said indicator indicates the interrupt packet, a special interrupt register is written by the packet handler for generating a hardware interrupt, e.g. for a core processor, so as to start processing the available samples of the N lanes.

It is noted that such interrupt packets may be assigned a more specific or different condition, e.g. all samples of all lanes up to some instant having been transferred, while also indicating said instant. Various interrupt packets may effectively be applied for synchronizing the processing of data samples in a chain of radio units.

Optionally, in the device, the serial interface comprises a serial interface controller arranged for formatting data samples in packets to be transmitted, and for retrieving data samples from packets as received. The serial interface controller may be implemented at least partially in hardware circuits, so as to enable fast handling and (de)formatting of the packets. Formatting may include inserting a predetermined number of the streaming samples in a packet, while including control data in a header to indicate the type of packet and/or the type of data in the packet, such as a reference to the lane that carries the data samples. Furthermore, the serial interface may be a serial interface according to a predetermined standard. The predetermined standard may, for example, be the Serial Rapid Input Output (sRIO) standard, or the Peripheral Component Interconnect Express (PI express) standard.

Optionally, the data samples arranged in lanes corresponding to antenna signals are further arranged in antenna-carrier units (AxC). A predetermined number of the antenna-carrier units may be arranged in each packet, including an explicit or implicit indication of the lanes to which the antenna-carrier units belong.

The above mentioned device, having one or more of said options, may be embodied in an integrated circuit, or in a module having hardware circuitry. Programmable elements may be used, such as FGPA, and various functions may be implemented by software or firmware stored in a program memory and executed in a processor, e.g. a core processor. Further examples of detailed embodiments are described below. Furthermore, the device may be used in a radio equipment controller unit (REC, 202) for a base station (BS) in a mobile communication system, or in a radio equipment unit (RE) for a base station (BS) in a mobile communication system.

Figure 4:
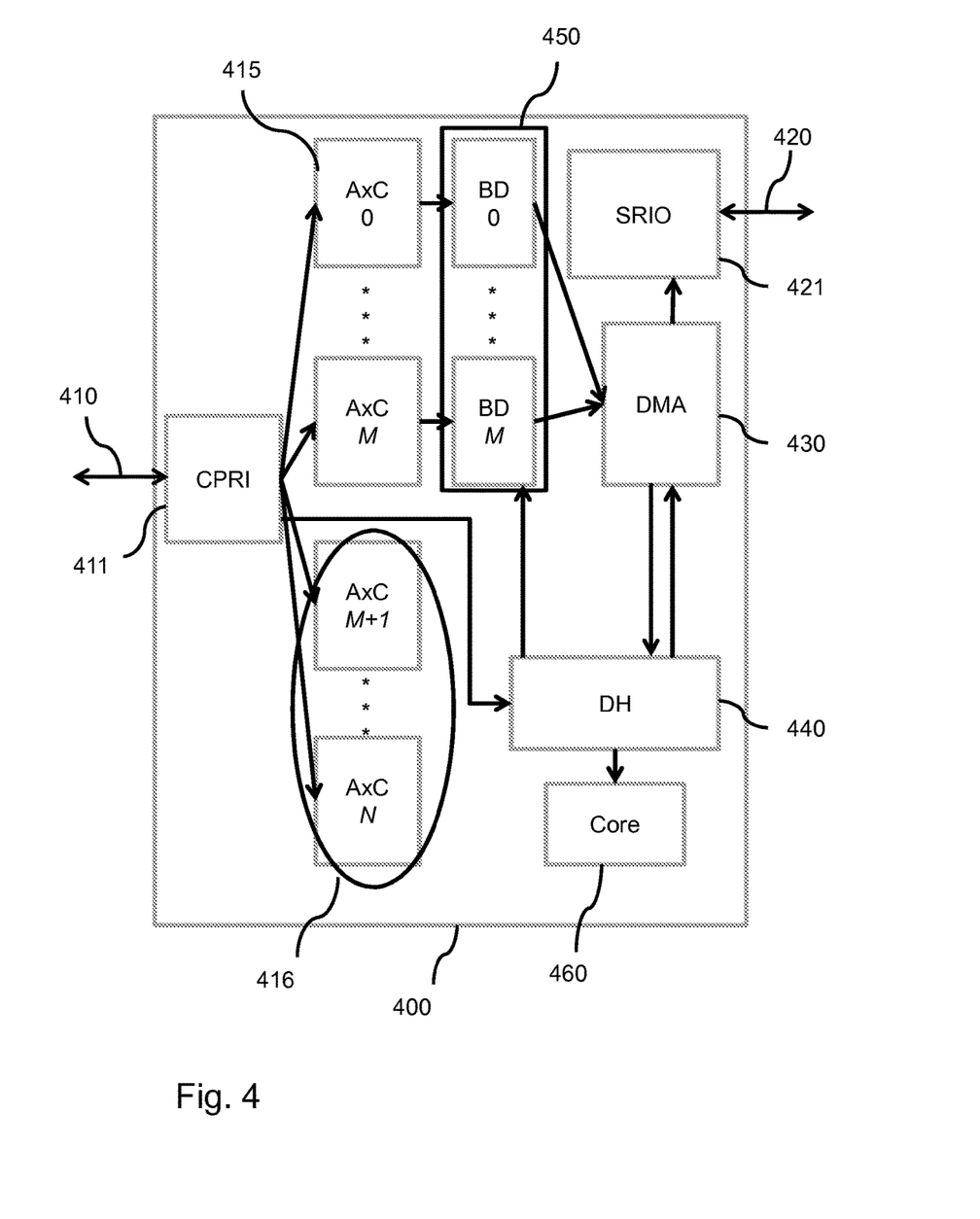
FIG. 4 shows an example of an uplink data flow in a device for a radio unit in a networking setup.

FIG. 4 shows an example of an uplink data flow in a device for a radio unit in a networking setup. The device 400 may be used in an REC or RE as described above, and active parts are shown for elucidating the uplink data flow in a chain of radio units; the device being in an intermediate networking position in the chain, i.e. coupled to a CPRI interface on one side and coupled to a combination of a common public radio interface and a separate serial interface on the other side. In the example the device 400 has a CPRI controller 411 providing a common public radio interface CPRI 410 for streaming data samples as indicated by an arrow to a radio equipment unit RE (not shown as such). It is noted that the CPRI controller may support further lanes that are coupled to further radio unit, e.g. a subsequent REC in a chain or an end-point REC, or a further RE. Also, the device has a serial interface controller 421 providing a separate serial interface SRIO 420 for exchanging packets with said further radio unit as indicated by an arrow. The device may have a direct memory access unit DMA 430 for directly accessing a memory and performing data transfers between the memory and further circuits, such as the serial interface controller 421 and a buffer descriptor ring memory 450. The device further has a data handler DH 440 coupled to the direct memory access unit and the CPRI interface, and the buffer descriptor ring memory. The data handler controls the interfacing of the data samples via the CPRI and separate serial interfaces, and may cooperate with a core processor 460. The data handler may also be implemented in a processor and embedded software.

In the device, the data handler is arranged for configuring the CPRI to select a number of lanes that are to be converted from streaming data to packets, and to control the serial controller so as to transfer the packets via the serial interface. The data handler so generates an uplink data flow to the subsequent radio unit, e.g. an end-point radio unit shown in FIG. 5. The data units 415 for a selected number of lanes are shown to be stored according to 0 to M buffer descriptors BDn, while a respective data unit is named antenna-carrier unit AxCn for lane n. A further number of data units, as indicated by an ellipse 416, is not to be forwarded to a subsequent unit but will be processed locally. The data handler DH controls the direct memory access unit to move the data samples from said selected lanes according to the buffer descriptors to the serial interface controller for being included in packets. The packets may be provided with a header indicating the respective lanes, the length of the packet, the type of the packet, etc to comply with the sRIO protocol. Finally the packets are transferred by the serial interface controller.

In practice, an embodiment may be as follows. A Networking REC 400 receives N AxCs from the RE (via CPRI). Each AxC is written to its respective buffer in a system memory. Data samples of N-M lanes are used for local processing and the M AxCs of the selected lanes are to be forwarded via sRIO by the data handler. The data handles may get CPRI timing data from the system timer and serial interface timing via sRIO interrupts through a virtual interrupt system (VSG) that may further generate interrupts to the core for error handling and for memory transactions to activate the DMA. The data handler may also manage the BD ring memory system.

An interrupt may be generated towards the core, indicating that a given amount of data has arrived to all AxCs. In the Networking REC a transmit flow of packets is generated via sRIO. The core may process the local N-M AxCs. The core, performing data handler functions, may prepare M buffer descriptor data (BDs) in a BD ring memory 450, the buffer descriptor data for each of the M AxC buffers, for example, comprising a destination address according to the AxC number. The data handler then programs the DMA unit to send these packets using the BD data. After all M packets have been sent, virtual interrupt packet may be sent, so as to trigger processing in the subsequent radio unit. The core may wait for an DMA interrupt indicating that the packets have been transmitted. The core doesn't wait until the packets arrive to the sRIO target. The core manages the BD ring (e.g. how many packets are in the ring) and the source and destination addresses of the AxCs. In the case of overrun of the data buffers the core may handle error reporting, while the core may create an error message to be sent to a control layer, and/or to the preceding or subsequent radio unit.

Figure 5:
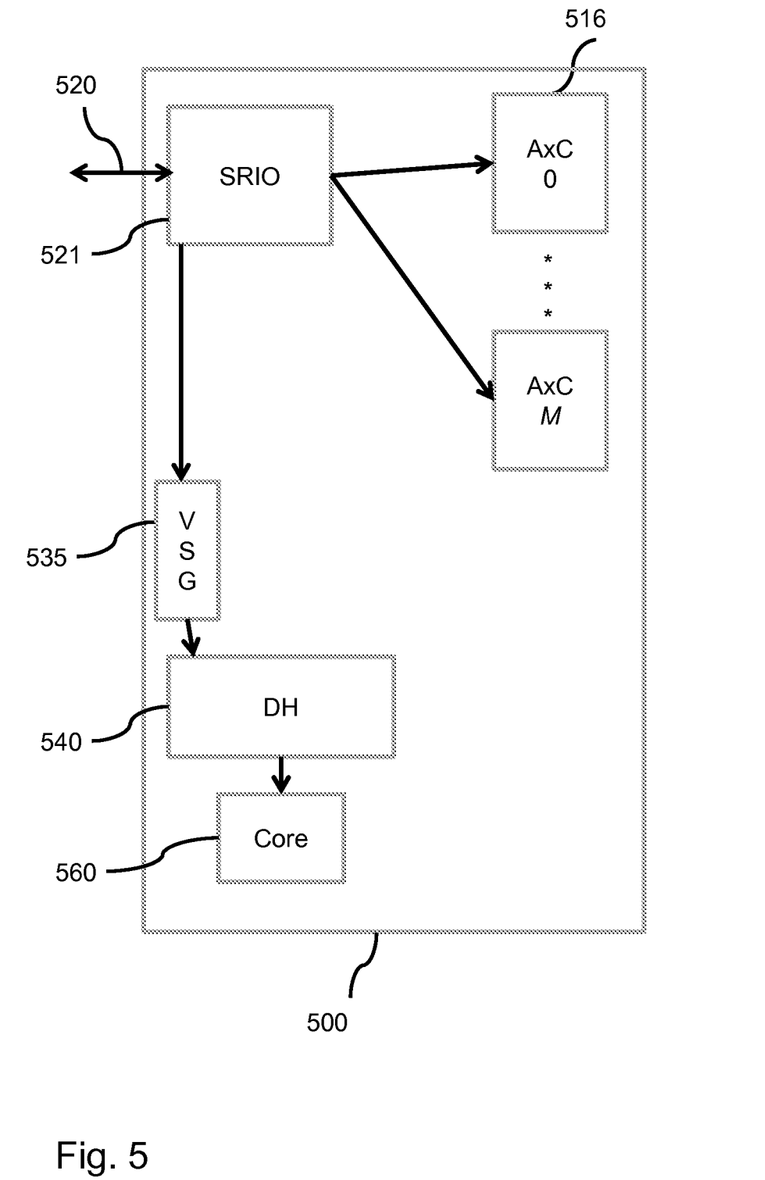
FIG. 5 shows an example of an uplink data flow in a device for a radio unit in an end-point setup.

FIG. 5 shows an example of an uplink data flow in a device for a radio unit in an end-point setup. The device 500 may be used in an REC or RE as described above, and active parts are shown for elucidating the uplink data flow in a chain of radio units; the device being in an end position in the chain, e.g. coupled to a combination of a common public radio interface and a separate serial interface only on one side. In the example the device 500 may have a CPRI controller (not shown) providing a common public radio interface for streaming data samples. The device has a serial interface controller 521 providing a separate serial interface SRIO 520 for exchanging packets with a preceding radio unit as indicated by an arrow. The device further has a data handler DH 540 coupled to the serial interface controller and, optionally, the CPRI interface. The data handler controls the interfacing of the data samples via separate serial interface and, optionally, the CPRI, and may cooperate with a core processor 560. The data handler may also be implemented in a processor and embedded software. A virtual interrupt unit 535 is coupled to the serial data controller for receiving interrupt packets, and may generate an interrupt based on such packets to the data handler and/or the core processor for triggering the data handing and/or processing for a number of lanes as indicated in said interrupt packets.

In the device, the data handler is arranged for configuring the serial interface controller to receive and select packets containing data samples, e.g. based on a packet type indicated in a header. The data samples are retrieved from the packets and converted for a number of lanes by storing in respective buffers 516 so as to enable processing the data samples similar to streaming data arriving on the CPRI. The data handler so receives an uplink data flow from the preceding radio unit, e.g. a networking radio unit shown in FIG. 4.

In practice, in the end-point setup of a radio unit, the data handler may handle sRIO overrun conditions related to data sample packets similar to overrun conditions of other sRIO packets. For the uplink data flow, the sRIO controller gets the sRIO data sample packets and writes them to the system memory according to their AxC destination address. After receiving all the M AxCs, an interrupt (via the virtual interrupt unit VSG) informs the core to take the data of the relevant AxCs. The interrupt may be generated by the VSG based on information from the data handler and/or the serial interface controller about the amount of data received and the setup of lanes selected for transfer via the serial interface. It is noted that the buffers mentioned may have a size different from a packet, e.g. double buffers. The size of each packet may be half of the size of the AxC buffer. A first half of such buffer may be processed while the second half of the buffer is ready for transmitting and/or receiving data samples. The sRIO should empty/fill the respective parts of the buffers quick enough to enable new data samples being received or processed.

Figure 6:
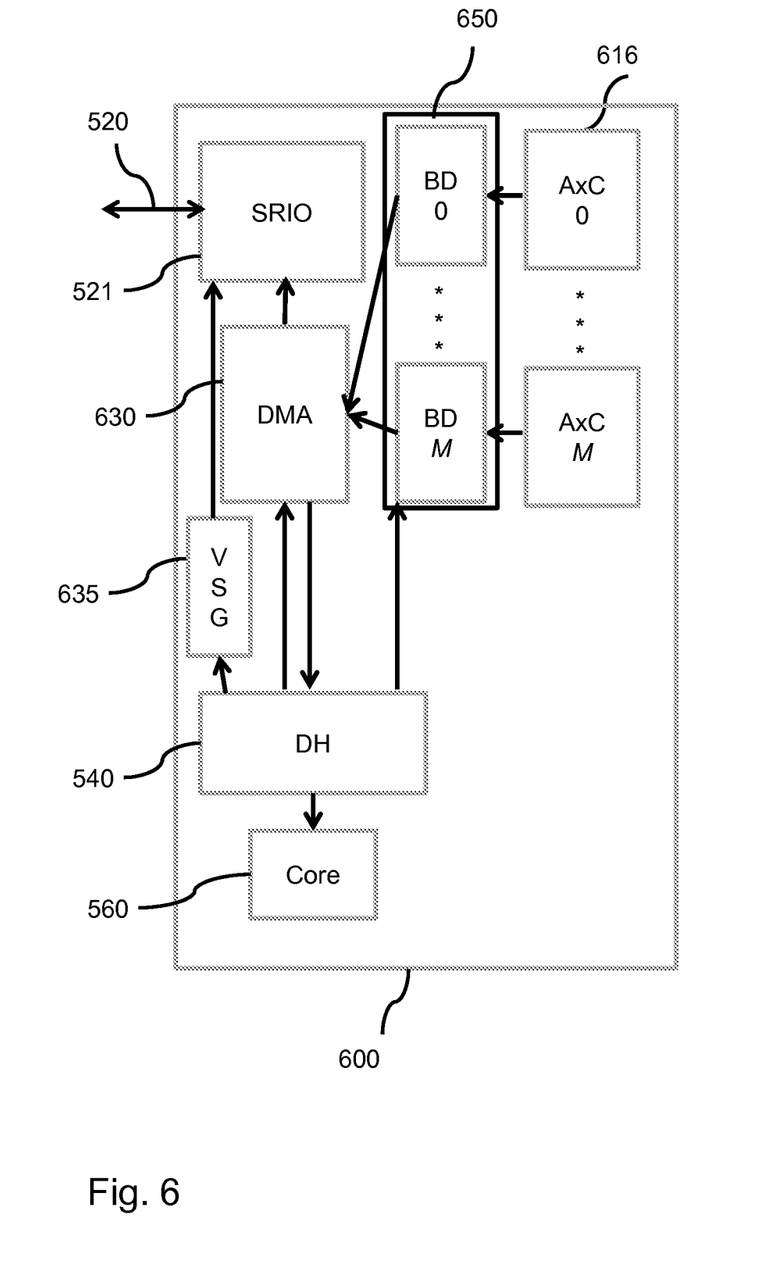
FIG. 6 shows an example of a downlink data flow in a device for a radio unit in an end-point setup.

FIG. 6 shows an example of a downlink data flow in a device for a radio unit in an end-point setup. The device 600 corresponds to the device shown in FIG. 5, may be used in an REC or RE, and active parts are shown for elucidating the downlink data flow in a chain of radio units; the device being in an end position in the chain, e.g. coupled to a combination of a common public radio interface and a separate serial interface only on one side. In the example the device 600 may have a CPRI controller (not shown) providing a common public radio interface for streaming data samples. The device has a serial interface controller 521 providing a separate serial interface SRIO 520 for exchanging packets with a preceding radio unit as indicated by an arrow. The device further has a data handler DH 540 coupled to the serial interface controller and, optionally, the CPRI interface. The data handler controls the interfacing of the data samples via separate serial interface and, optionally, the CPRI, and may cooperate with a core processor 560. The data handler may also be implemented in a processor and embedded software.

In the device, the data handler is arranged for configuring the serial interface controller to transmit packets containing data samples, e.g. including a packet type indicated in a header. The data samples are retrieved from data buffers 616 for a number of lanes as prepared by processing the data samples similar to streaming data to be transmitted via CPRI. The data handler so controls a downlink data flow to the preceding radio unit, e.g. a networking radio unit shown in FIG. 7. The device may have a virtual interrupt unit 635 coupled to the serial data controller for generating interrupt packets, and may generate an interrupt packet based on data from the data handler and/or the core processor triggered by completion of the data handing and/or processing for a number of lanes.

In practice, the core or data handler circuit may wait for a virtual interrupt from the preceding radio unit indicating that the AxCs should be transmitted and prepares M BDs in a BD ring memory 650. The required data samples for each of the selected lanes are generated in M AxC buffers, and destination addresses are prepared according to the AxC number. Subsequently, the DMA unit is programmed to send the packets using the BD data. After all the M packets have been sent, a virtual interrupt packet is sent. The data handler may wait for a DMA interrupt indicating that the packets have been transmitted, but need not wait until the packets arrive to the sRIO target. The data handler may manage the DMA unit, the BD ring system (e.g. how many packets are in the ring) and the source and destination addresses of the AxCs. In the case of overrun the data handler handles the error reporting, while the core may create an error message to be sent to the control layer.

Figure 7:
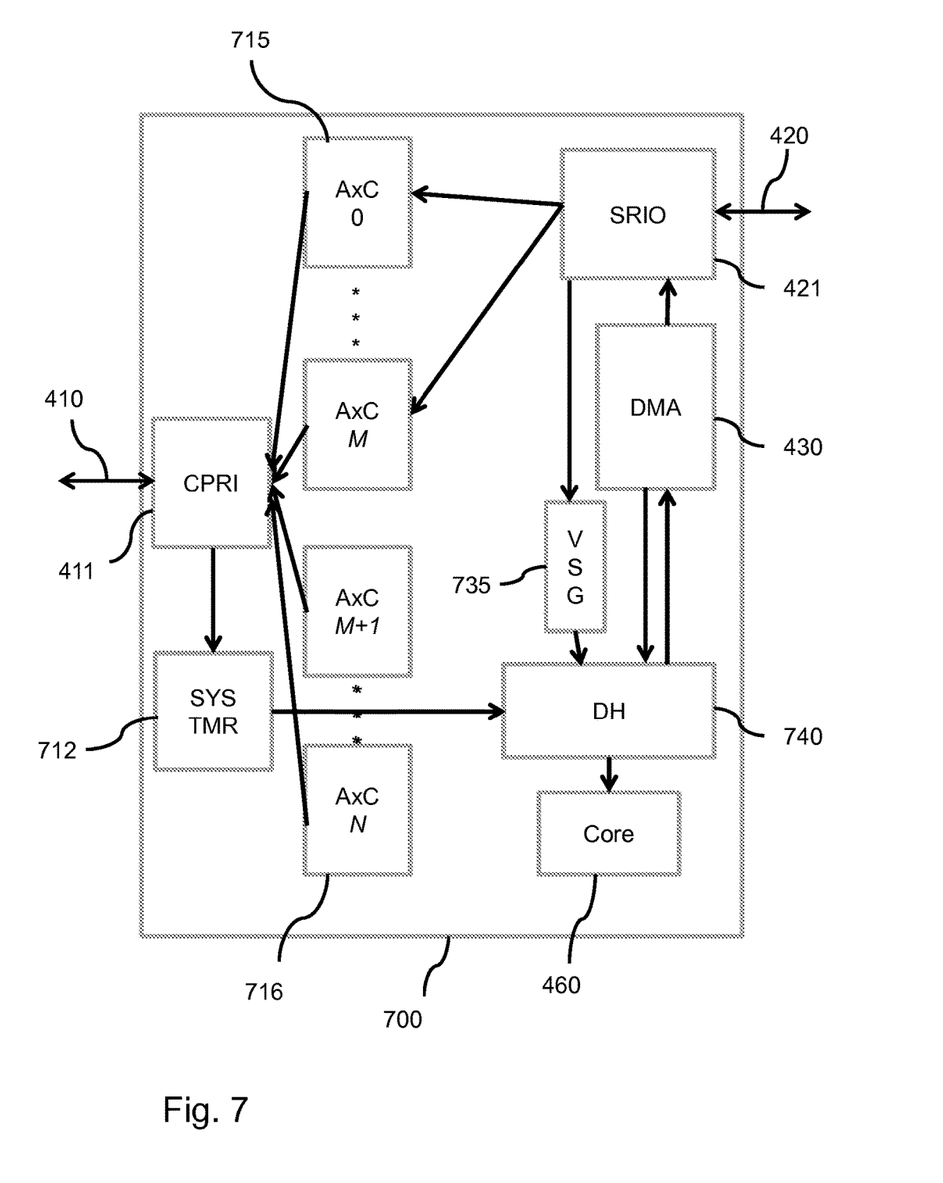
FIG. 7 shows an example of a downlink data flow in a device for a radio unit in a networking setup.

FIG. 7 shows an example of a downlink data flow in a device for a radio unit in a networking setup. The device 700 corresponds to the device shown in FIG. 4, may be used in an REC or RE, and active parts are shown for elucidating the downlink data flow in a chain of radio units; the device being in an intermediate networking position in the chain, i.e. coupled to a CPRI interface on one side and coupled to a combination of a common public radio interface and a separate serial interface on the other side. In the example the device 700, like the device shown in FIG. 4, has the CPRI controller 411 providing the common public radio interface CPRI 410, the serial interface controller 421 providing the separate serial interface SRIO 420, the direct memory access unit DMA 430. The device further has a system timer SYSTMR 712 coupled to the CPRI controller 411, and a data handler DH 740 coupled to the direct memory access unit and the system timer. The data handler controls the interfacing of the data samples via the CPRI and separate serial interfaces, and may cooperate with the core processor 460. The data handler may also be implemented in a processor and embedded software.

In the device, the data handler is arranged to control the serial controller so as to receive the packets containing data samples via the serial interface, and retrieve the data samples. The data samples are stored in data buffers 715 for the selected channels, while further data buffers 716 store data samples generated locally. The data handler so handles a downlink data flow to the preceding radio unit, e.g. an radio equipment unit not shown as such. The data units 715 for the selected number of lanes are shown to contain a respective data unit named antenna-carrier unit AxCn for lane n. The data handler DH controls the direct memory access unit to move the data samples from the serial interface controller to the buffers for said selected lanes according to the lane addresses included in packets. The device may have a virtual interrupt unit VSG 735 coupled to the serial data controller for receiving interrupt packets, and may generate an interrupt based on such packets to the data handler and/or the core processor for triggering the data handing and/or processing for a number of lanes as indicated in said interrupt packets.

In practice, the sRIO controller may get the RIO packets and write them to the system memory according to their AxC destination address. After receiving all packets for the M AxCs, an interrupt informs the core to take the data of the relevant AxCs. Subsequently, the device transmits a full set of N AxCs to the preceding radio unit, for example a radio equipment unit. Each of the AxCs is prepared in its respective buffer in the system memory, wherein N-M units are locally prepared and the selected M units have been received via the serial interface sRIO. Initially, when setting up the data flow, two virtual interrupts may be sent to the subsequent radio unit. After all the N AxCs are ready, a CPRI transfer of the IQ data samples to the preceding radio unit may be started, e.g by enabling DMA from the buffers to the CPRI. Based on the time-notion (also called CPRI hyper frame), the system timers 712 are informing the data handler that a new transfer should be prepared.

It is to be noted that the sRIO is a packet based protocol with no time stamp as packets are asynchronous and not connected to any timebase. On the contrary, the CPRI IQ protocol is a streaming protocol which is connected to the CPRI timebase. In order to be able to convert data streams between both protocols, the system timer 712 in the radio unit generates such timebase for controlling the sRIO interface in order to have it synchronized to the CPRI timebase. In the uplink direction no separate timer is needed as it is the responsibility of the sRIO to forward the packets to the next radio unit quick enough to keep up with the IQ data traffic. In the downlink direction the function of the system timer is required as it has to inform the sRIO in the next radio unit (e.g. the EndPoint REC) to send packets so that the data is available in time in order to provide enough data for the streaming interface. The system timer and its connectivity in the device allow the sRIO protocol to provide sufficient IQ packets, i.e. to keep them running according to the time base.

The local core then prepares the next N-M AxCs and the data handler transmits an sRIO virtual interrupt to the subsequent radio unit to initiate transfer of a new set of packets for the selected lanes. It is noted that the buffers may be twice (or more) the size of the respective data sample packets, to receive new packets while the previous set is still being transferred via CPRI.

It is noted that the data handler functions may be implemented in a processor by embedded software, or, at least partially, in hardware circuits. Also, the BD ring buffer management including the increment of buffer pointers may be may be implemented in a processor by embedded software, or, at least partially, in hardware circuits.

Optionally, the serial interface may be a PCI express serial interface. The PCI Express (Peripheral Component Interconnect Express), is a well known high-speed serial computer expansion bus standard. The PCI data flow is similar to the flows described above, but with a PCI express Controller instead of the sRIO controller. The DMA control and the further flows are identical.

The above system could be used generally by radio communication stations built in a daisy chain topology (e.g. RECs and REs) where the IQ traffic to be forwarded by a Networking device is more than the capability of the CPRI lanes. In this case part of the traffic can be forwarded through the existing sRIO interface. Moreover it enables a seamless IQ data traffic bypass through a REC device from a CPRI interface (which is a data-stream protocol) to an sRIO interface (which is a packet based protocol) and vice versa. It enables a additional system connectivity where the radio unit is connected to an RE or Networking REC via CPRI on one hand and to a further networking REC or End-Point REC via sRIo on the other hand.

The above interfacing method may be implemented in any radio unit in a chain in a base station. The device as described above with reference to FIGS. 4-7 may be a semiconductor device for a communication device, in the form of an integrated circuit. The IC may be a Field Programmable Gate Array (FPGA), a microcontroller including peripherals circuits, a digital signal processor (DSP), or a suitably programmed general purpose processor (GPP). Also, the device may be a radio unit comprising such a programmable processor, the programmable processor being arranged to execute a program code comprising instructions for causing the programmable processor to perform the method.

Optionally, the program code may be provided on a computer readable medium, also called a medium comprising a computer program product, the computer program product comprising instructions for causing a processor apparatus to perform the above interfacing method. The computer program product may further comprise instructions for causing a processor apparatus to perform other processing stages of the receive chain, such as frequency domain processing. The computer program product may be embodied on a computer readable medium as physical marks or by means of magnetization of the computer readable medium, e.g. an optical disc, a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices such as FPGA or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of interfacing in a base station in a mobile communication system, the base station comprising radio units, different types of the radio units including at least one radio equipment unit coupled to at least one antenna and at least one radio equipment controller unit for controlling the radio equipment unit, the radio units having a common public radio interface for streaming data samples arranged in a plurality of lanes corresponding to antenna signals and a serial rapid input output interface for transferring packets separate from the common public radio interface, the method comprising:

storing, by a direct memory access unit, selected data samples from selected lanes of the plurality of lanes of the streamed data samples in a memory of a first radio unit according to a buffer descriptor, wherein the data samples arranged in the plurality of lanes were streamed from a preceding radio unit to the first radio unit;

transferring, by the direct memory access unit, the selected data samples between the first and a second radio unit, the selected data samples converted to packets of selected data samples by the serial rapid input output interface, the packets of selected data samples corresponding to the selected lanes streamed from the preceding radio unit via the common public radio interface; and transferring further data samples arranged in further lanes of the plurality of lanes to the first radio unit, the further lanes being streamed from the preceding radio unit via the common public radio interface and are in addition to the selected lanes of the plurality of lanes, wherein the further data samples of the further lanes are processed in the first radio unit and wherein the selected data samples bypass processing in the first radio unit and are transferred to the second radio unit.

2. Method as claimed in claim 1, wherein the method comprises:

transferring a predetermined amount of the selected data samples for the selected lanes arranged in M packets via the serial rapid input output interface; and generating and transferring, between the first and second radio unit via the serial rapid input output interface, an interrupt packet after transferring said M packets for the selected lanes.

3. A device, for use in a radio unit, the radio unit coupled to at least one radio equipment unit, the at least one radio equipment unit coupled to at least one antenna and at least one radio equipment controller unit for controlling the radio equipment unit, the device comprising:

a common public radio interface for streaming data samples arranged in a plurality of lanes corresponding to antenna signals and a serial rapid input output interface for converting the streamed data samples to packets of data samples and for transferring the data samples arranged in packets, the serial rapid input output interface separate from the common public radio interface; and a data handler comprising a direct memory access unit for directly accessing a memory of the device, the data handler arranged for providing a buffer descriptor to the direct memory access unit, storing selected data samples from selected lanes of the plurality of lanes of the streamed data samples in the memory of the device according to the buffer descriptor, the streamed data samples of the plurality of lanes streamed from a preceding radio unit, transferring the selected data samples from the memory to the serial rapid input output interface according to the buffer descriptor, and transferring the selected data samples to a subsequent radio unit, the selected data samples arranged in packets via the serial rapid input output interface, the selected data samples corresponding to selected lanes streamed between the device and the preceding radio unit via the common public radio interface, the selected data samples bypassing processing in the radio unit, and transferring further data samples arranged in further lanes of the plurality of lanes to the subsequent radio unit, the further lanes streamed from the data samples in addition to the selected lanes, the further data samples of the further lanes are processed in the radio unit.

4. Device as claimed in claim 3, wherein the data handler is configured for providing the buffer descriptor for respective data buffers corresponding to units of antenna data.

5. Device as claimed in claim 3, wherein the data handler is configured for maintaining a ring memory for storing buffer descriptors for respective data buffers, the sequence of stored buffer descriptors in the ring memory corresponding to sets of data samples to be transferred as packets.

6. Device as claimed in claim 3, wherein the data handler is arranged for transferring a predetermined amount of the selected data samples for the selected lanes arranged in M packets via the serial rapid input output interface, and for generating and transferring, to the subsequent radio unit via the serial rapid input output interface, an interrupt packet after transferring said M packets for the selected lanes.

7. Device as claimed in claim 3, wherein the device is configured for transferring data samples of N lanes to the subsequent radio unit via the common public radio interface, and the device is configured for generating and transferring, to a subsequent radio control device, an interrupt packet after transferring a predetermined amount of the data samples of the N lanes.

8. Device as claimed in claim 3, wherein the device is arranged for receiving an interrupt packet indicative of transferring, by a preceding radio unit, a predetermined amount of the selected data samples for the selected lanes arranged in M packets via the serial interface, and comprises an interrupt unit for, upon receiving the interrupt packet, triggering processing the selected data samples according to data samples arranged in lanes.

9. Device as claimed in claim 3, wherein the device is arranged for receiving an interrupt packet indicative of transferring, by a preceding radio unit, a predetermined amount of the data samples of the N lanes, and comprises an interrupt unit for, upon receiving the interrupt packet triggering processing the predetermined amount of the data samples.

10. Device as claimed in claim 3, wherein the serial rapid input output interface comprises a serial interface controller arranged for formatting data samples in packets to be transmitted, and for retrieving data samples from packets as received.

11. Device as claimed in claim 3, wherein the device comprises a system timer for generating a common public radio interface timebase for synchronizing the serial rapid input output interface to said timebase.

12. Device as claimed in claim 3, wherein the data samples arranged in the plurality of lanes corresponding to antenna signals are further arranged in antenna-carrier units.

13. Radio equipment controller unit for a base station in a mobile communication system, the radio equipment controller unit comprising the device according to claim 3.

14. Radio equipment unit for a base station in a mobile communication system, the radio equipment unit comprising the device according to claim 3.

15. Integrated circuit comprising the device according to claim 3.

* * * * *